(12) United States Patent
Slingwine et al.

(10) Patent No.: US 6,219,690 B1
(45) Date of Patent: *Apr. 17, 2001

(54) APPARATUS AND METHOD FOR ACHIEVING REDUCED OVERHEAD MUTUAL EXCLUSION AND MAINTAINING COHERENCY IN A MULTIPROCESSOR SYSTEM UTILIZING EXECUTION HISTORY AND THREAD MONITORING

(75) Inventors: John D. Slingwine; Paul E. McKenney, both of Beaverton, OR (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/742,987

(22) Filed: Nov. 1, 1996

Related U.S. Application Data

(62) Division of application No. 08/480,627, filed on Jun. 7, 1995, now Pat. No. 5,608,893, which is a division of application No. 08/094,629, filed on Jul. 19, 1993, now Pat. No. 5,442,758.

(51) Int. Cl.[7] .................................................. G06F 12/00
(52) U.S. Cl. ............................................................. 709/102
(58) Field of Search .................................... 709/102, 107, 709/108, 100

(56) References Cited

U.S. PATENT DOCUMENTS

| | | | |
|---|---|---|---|
| 4,494,188 | * | 1/1985 | Nakane et al. ........................ 364/200 |
| 4,747,043 | | 5/1988 | Rodman . |
| 5,027,316 | | 6/1991 | Frantz et al. . |

(List continued on next page.)

OTHER PUBLICATIONS

W. W. Collier, et al, "Spin Queues", IBM Techinical Disclosure Bulletin, vol. 18, No. 6, pp. 1953–54, Nov. 1975.*
Gharachorloo et al, Performance Evaluation of Memory Consistency Modes, for Shared Memory Multiprocessors, ACM 1991.*

(List continued on next page.)

*Primary Examiner*—Majid Banankhah
*Assistant Examiner*—Sue Lao
(74) *Attorney, Agent, or Firm*—Klarquist Sparkman Campbell Leigh & Whinston LLP

(57) ABSTRACT

A substantially zero overhead mutual-exclusion apparatus and method (90, 120) is provided that allows concurrent reading and updating data while maintaining data coherency. That is, a data reading process executes the same sequence of instructions that would be executed if the data were never updated. Rather than depending exclusively on overhead-imposing locks, this mutual-exclusion mechanism tracks an execution history (138) of a thread (16, 112) to determine safe times for processing a current generation (108, 130, 131) of data updates while a next generation (110, 132, 133) of data updates is concurrently being saved. A thread is any locus of control, such as a processor. A summary of thread activity (106, 122) tracks which threads have passed through a quiescent state after the current generation of updates was started. When the last thread related to the current generation passes through a quiescent state, the summary of thread activity signals a callback processor (104, 124) that it is safe to end the current generation of updates. The callback processor then processes and erases all updates in the current generation. The next generation of updates then becomes the current generation of updates. The callback processor restarts the summary of thread activity and initiates a new next generation of updates. All data-updating threads pass through a quiescent state between the time they attempt to update data and the time the data are actually updated.

6 Claims, 11 Drawing Sheets

U.S. PATENT DOCUMENTS

| | | |
|---|---|---|
| 5,185,861 | 2/1993 | Valencia . |
| 5,214,766 | 5/1993 | Lui . |
| 5,249,283 | 9/1993 | Boland . |
| 5,442,758 * | 8/1995 | Slingwine et al. .................. 395/375 |
| 5,608,893 * | 3/1997 | Slingwine et al. .................. 395/468 |

OTHER PUBLICATIONS

Landin et al, Race–free Interconnection Networks and Multiprocessor Consistency, ACM 1991.*

Gibbons et al, The Complexity of Sequential Consistency, IEEE 1992.*

Mohindra et al, A Survey of Distributed Shared Memory in Loosely Coufled System Jan. 1991.*

Adve et al, Weak Ordering a New Definition, IEEE 1990.*

Dubois et al, Synchronization, Coherence and Event Ordering in Multiprocessors, Feb. 1988 IEEE.*

Bershad et al, The Midway Distributed Shared Memory System, IEEE 1993.*

Cache Coherence Protocols: Evaluation Using a Multiprocessor Simulation Model, James Archibald and Jean–Loup Baer, ACM Transactions on Computer Systems, vol. 4, No. 4, pp. 273–298, Nov. 1986.

An Economical Solution to the Cache Coherence Problem, James Archibald and Jean–Loup Baer, Proc. 11th Annual Symposium on Computer Architecture, IEEE, pp. 355–362, 1984.

A New Solution to Coherence Problems in Multicache Systems, Lucien M. Censier and Paul Feautrier, IEEE Transactions on Computers, vol. C–27, No. 12, pp. 1112–1118, Dec. 1978.

Computer Architecture and Design, A.J. van de Goor, Addison–Wesley Publishers Limited, Workingham, England, pp. 473–506, 1989.

Symmetry Technical Summary, Sequent Computer Systems, Inc., Beaverton, Oregon, pp. 1.18, 1.19, 2.8, 2.9, 5.2–5.4, and A.4–A9, 1987.

The Design of the UNIX Operating System, Maurice J. Bach, Prentice–Hall, Inc., Englewood Cliffs, New Jersey, pp. 30, 31, 77, 96–103, and 391–410, 1986.

* cited by examiner

APPARATUS AND METHOD FOR ACHIEVING REDUCED OVERHEAD MUTUAL EXCLUSION AND MAINTAINING COHERENCY IN A MULTIPROCESSOR SYSTEM UTILIZING EXECUTION HISTORY AND THREAD MONITORING

This is a division of Application No. 08/480,627, now U.S. Pat. No. 5,608,893 filed Jun. 7, 1995, which is a division of U.S. Pat. No. 5,442,758, filed Jul. 19, 1993.

TECHNICAL FIELD

This invention relates to computer systems and more particularly to a reduced overhead mutual-exclusion mechanism that provides data coherency and improves computer system performance.

BACKGROUND OF THE INVENTION

Data coherency is threatened whenever two or more computer processes compete for a common data item that is stored in a memory or when two or more copies of the same data item are stored in separate memories and one item is subsequently altered. Previously known apparatus and methods for ensuring data coherency in computer systems are generally referred to as mutual-exclusion mechanisms.

A variety of mutual-exclusion mechanisms have evolved to ensure data coherency. Mutual-exclusion mechanisms prevent more than one computer process from accessing and/or updating (changing) a data item or ensure that any copy of a data item being accessed is valid. Unfortunately, conventional mutual-exclusion mechanisms degrade computer system performance by adding some combination of procedures, checks, locks, program steps, or complexity to the computer system.

Advances in processor and memory technology make it possible to build high-performance computer systems that include multiple processors. Such computer systems increase the opportunity for data coherency problems and, therefore, typically require multiple mutual-exclusion mechanisms.

When multiple processors each execute an independent program to accelerate system performance, the overall system throughput is improved rather than the execution time of a single program.

When the execution time of a single program requires improvement, one way of improving the performance is to divide the program into cooperating processes that are executed in parallel by multiple processors. Such a program is referred to as a multitasking program.

Referring to FIG. 1A, multiple computers 10 are interconnected by an interconnection network 12 to form a computer system 14. FIG. 1B shows that a typical one of computer 10 includes N number of processors 16A, 16B, . . . , and 16N (collectively "processors 16"). In computer 10 and computer system 14, significant time is consumed by intercommunication. Intercommunication is carried out at various levels.

In computer 10, at a processor memory interface level, processors 16 access data in a shared memory 18 by transferring data across a system bus 20. System bus 20 requires a high-communication bandwidth because it shares data transfers for processors 16. Computer 10 is referred to as a multiprocessor computer.

In computer system 14, at an overall system level, computers 10 each have a shared memory 18 and interconnection network 12 is used only for intercomputer communication. Computer system 14 is referred to as a multicomputer system.

The high threat to data coherency in multicomputer and multiprocessor systems is caused by the increased competition among processors 16 for data items in shared memories 18.

Ideally, multicomputer and multiprocessor systems should achieve performance levels that are linearly related to the number of processors 16 in a particular system. For example, 10 processors should execute a program 10 times faster than one processor. In a system operating at this ideal rate, all processors contribute toward the execution of the single program, and no processor executes instructions that would not be executed by a single processor executing the same program. However, several factors including synchronization, program structure, and contention inhibit multicomputer and multiprocessor systems from operating at the ideal rate.

Synchronization: The activities of the independently executing processors must be occasionally coordinated, causing some processors to be idle while others continue execution to catch up. Synchronization that forces sequential consistency on data access and/or updates is one form of mutual exclusion.

Program structure: Not every program is suited for efficient execution on a multicomputer or a multiprocessor system. For example, some programs have insufficient parallelism to keep all multiple processors busy simultaneously, and a sufficiently parallel program often requires more steps than a serially executing program. However, data coherency problems increase with the degree of program parallelism.

Contention: If processor 16A competes with processor 16B for a shared resource, such as sharable data in shared memory 18, contention for the data might cause processor 16A to pause until processor 16B finishes using and possibly updating the sharable data.

Any factor that contributes to reducing the ideal performance of a computing system is referred to as overhead. For example, when processors 16A and 16B simultaneously request data from shared memory 18, the resulting contention requires a time-consuming resolution process. The number of such contentions can be reduced by providing processors 16 with N number of cache memories 22A, 22B, . . . , and 22N (collectively "cache memories 22"). Cache memories 22 store data frequently or recently executed by their associated processors 16. However, processors 16 cannot efficiently access data in cache memories 22 associated with other processors. Therefore, cached data cannot be readily transferred among processors without increased overhead.

Incoherent data can result any time data are shared, transferred among processors 16, or transferred to an external device such as a disk memory 24. Thus, conventional wisdom dictates that computer performance is ultimately limited by the amount of overhead required to maintain data coherency.

Prior workers have described various mutual-exclusion techniques as solutions to the data coherence problem in single and multiprocessor computer systems.

Referring to FIG. 2, Maurice J. Bach, in *The Design of the UNIX Operating System,* Prentice-Hall, Inc., Englewood Cliffs, N.J., 1986 ("Bach") describes single processor and multiprocessor computer implementations of a UNIX® operating system in which a process 30 has an asleep state 32, a ready to run state 34, a kernel running state 36, and a user running state 38. Several processes can simultaneously operate on shared operating system data leading to operating system data coherency problems. Bach solves the operating system data coherency problem by allowing process 30 to update data only during a process state transition 40 from kernel running state 36 to asleep state 32. Process 30 is inactive in asleep state 32. Data coherency is also protected by using data "locks" that prevent other processes from reading or writing any part of the locked data until it is "unlocked."

Referring again to FIG. 1, Lucien M. Censier and Paul Feautrier, in "A New Solution to Coherence Problems in Multicache Systems, " *IEEE Transactions on Computers*, Vol. C-27, No. 12, December 1978 ("Censier and Feautrier") describe a presence flag mutual-exclusion technique. This technique entails using data state commands and associated state status lines for controlling data transfers among N number of cache memory controllers 50A, 50B, . . . , and 50N (collectively "cache controllers 50") and a shared memory controller 52. The data state commands include shared read, private read, declare private,.invalidate data, and share data. Advantageously,.no unnecessary data invalidation commands are issued and the most recent (valid) copy of a shared data item can quickly be found. Unfortunately, cache memory data structures must be duplicated in shared memory controller 52 and costly nonstandard memories are required. Moreover, performance is limited because system bus 20 transfers the data state commands.

A. J. van de Goor, in *Computer Architecture and Design*, Addison-Wesley Publishers Limited, Workingham, England, 1989, classifies and describes single path, single data ("SPSD"); single path, multiple data ("SPMD"); multiple path, single data ("MPSD"); and multiple path, multiple data ("MPMD")computer system architectures from a data coherence perspective as summarized in Table 1.

TABLE 1

|  | Single Data | Multiple Data |
| --- | --- | --- |
| Single Path | SPSD | SPMD |
| Multiple Path | MPSD | MPMD |

Single data ("SD") indicates that only one copy of a data item exists in computer 10, whereas multiple data ("MD") indicates that multiple copies of the data item may coexist, as commonly happens when processors 16 have cache memories 22.

Single path ("SP") indicates that only one communication path exists to a stored data item, whereas multiple paths ("MP") indicates that more than one path to the same data item exists, as in a multiprocessor system with a multiport memory. The classification according to Table 1 results in four classes of computer systems.

SPSD systems include multiprocessor systems that time-share a single bus or use a crossbar switch to implement an interconnection network. In such systems, the processors do not have cache memories. Such systems do not have a data coherence problem because the conventional conditions necessary to ensure data coherence are satisfied—only one path exists to the data item at a time, and only one copy exists of each data item.

Although no processor-associated cache memories exist, shared memory 18 can include a performance-improving shared memory cache that appears to the processors as a single memory. Data incoherence can exist between the shared memory cache and the shared memory. In general, this solution is not attractive because the bandwidth of a shared cache memory is insufficient to support many processors.

MPSD systems are implemented with multiport memories in which each processor has a switchable dedicated path to the memory.

MPSD systems can process data in two ways. In a single-access operation, memory data are accessed sequentially, with only a single path to and a single copy of each data item existing at any time, thereby ensuring data coherence. In a multiple-access operation, a data-accessing processor locks its memory path or issues a data locking signal for the duration of the multiple-access operation, thereby ensuring a single access path for the duration of the multiple-access operation. Data coherence is guaranteed by the use of locks, albeit with associated overhead.

MPMD systems, such as computer 10 and computer system 14, are typically implemented with shared memory 18 and cache memories 22. Such systems have a potentially serious data coherence problem because more than one path to and more than one copy of a data item may exist concurrently.

Solutions to the MPMD data coherence problem are classified as either preventive or corrective. Preventive solutions typically use software to maintain data coherence while corrective solutions typically use hardware for detecting and resolving data coherence problems. Furthermore, corrective solutions are implemented in either a centralized or a distributed way.

Preventive solutions entail using software to designate all sharable and writable data as noncachable, making it accessible only in shared memory 18. When accessed by one of processors 16, the shared data are protected by software locks and by shared data structures until relinquished by the processor. To alleviate the obvious problem of increased data access time, the shared data structures may be stored in cache memory. The prevention software is responsible for restoring all updated data at shared memory 18, before releasing the software locks. Therefore, processors 16 need commands for purging data from associated cache memories 22.

Unfortunately, preventive solutions require specialized system software, a facility to identify sharable data, and a correspondingly complex compiler. Additionally, system performance is limited because part of the shared data are not cached.

Corrective solutions to data coherence problems are advantageous because they are transparent to the user, albeit at the expense of added hardware.

A typical centralized solution to the data coherence problem is the above-described presence flag technique of Censier and Feautrier.

In distributed solutions, cache memory controllers 50 maintain data coherence rather than shared memory controller 52. Advantages include reduced bus traffic for maintaining cache data states. This is important because, in a shared bus multiprocessor system, bus capacity often limits system performance. Therefore, approaching ideal system performance requires minimizing processor associated bus traffic.

Skilled workers will recognize that other solutions exist for maintaining data coherence including dedicated broadcast buses, write-once schemes, and data ownership schemes. The overhead cost associated with various data coherence techniques is described by James Archibald and Jean-Loup Baer, in "Cache Coherence Protocols: Evaluation Using a Multiprocessor Simulation Model," *ACM Transactions on Computer Systems,* Vol. 4, No. 4, November 1986. Six methods of ensuring cache coherence are compared in a simulated multiprocessor computer system. The simulation results indicate that choosing a data coherence technique for a computer system is a significant decision because the hardware requirements and performance differences vary widely among the techniques. In particular, significant performance differences exist between techniques that distribute updated data among cache memories and techniques that update data in one cache memory and invalidate copies in other cache memories. Comparative performance graphs show that all the techniques impose an overhead-based performance limit on the computer system.

What is needed, therefore, is a substantially zero-overhead mutual-exclusion mechanism that provides for concurrently reading and/or updating data while maintaining data coherency. Such a mechanism would be especially useful if it is capable of maintaining the coherency of data shared throughout a networked multicomputer system.

SUMMARY OF THE INVENTION

An object of this invention is, therefore, to provide an apparatus and a method for ensuring substantially zero-overhead data coherency in a computer.

Another object of this invention is to provide a mutual-exclusion apparatus and method capable of operating in a multicomputer system.

A further object of this invention is to improve the program execution performance of multiprocessor and multicomputer systems.

This invention is a substantially zero-overhead mutual-exclusion apparatus and method that allow concurrent reading and updating data while maintaining data coherency. That is, a data reading process executes the same sequence of instructions that would be executed if the data were never updated. Rather than depending exclusively on overhead-imposing locks, this mutual-exclusion mechanism tracks a thread (a locus of control such as a processor) execution history to determine safe times for processing a current generation of data updates while a next generation of data updates is concurrently being saved. A summary of thread activity tracks which threads have passed through a quiescent state after the current generation of updates was started. When the last thread related to the current generation passes through a quiescent state, the summary of thread activity signals a callback processor that it is safe to end the current generation of updates. The callback processor then processes and erases all updates in the current generation. The next generation of updates then becomes the current generation of updates. The callback processor restarts the summary of thread activity and initiates a new next generation of updates. All data-updating threads pass through a quiescent state between the time they attempt to update data and the time the data are actually updated.

This mutual-exclusion mechanism requires practically no data locks when accessing shared data, resulting in reduced overhead and data contention, and it is not so susceptible to deadlock as conventional mechanisms. Reducing deadlock susceptibility provides a corresponding reduction in or elimination of overhead required for avoiding or detecting and repairing deadlocks.

Additional objects and advantages of this invention will be apparent from the following detailed description of preferred embodiments thereof which proceeds with reference to the accompanying drawings.

DETAILED DESCRIPTION OF PREFERRED EMBODIMENTS

Figure 3:
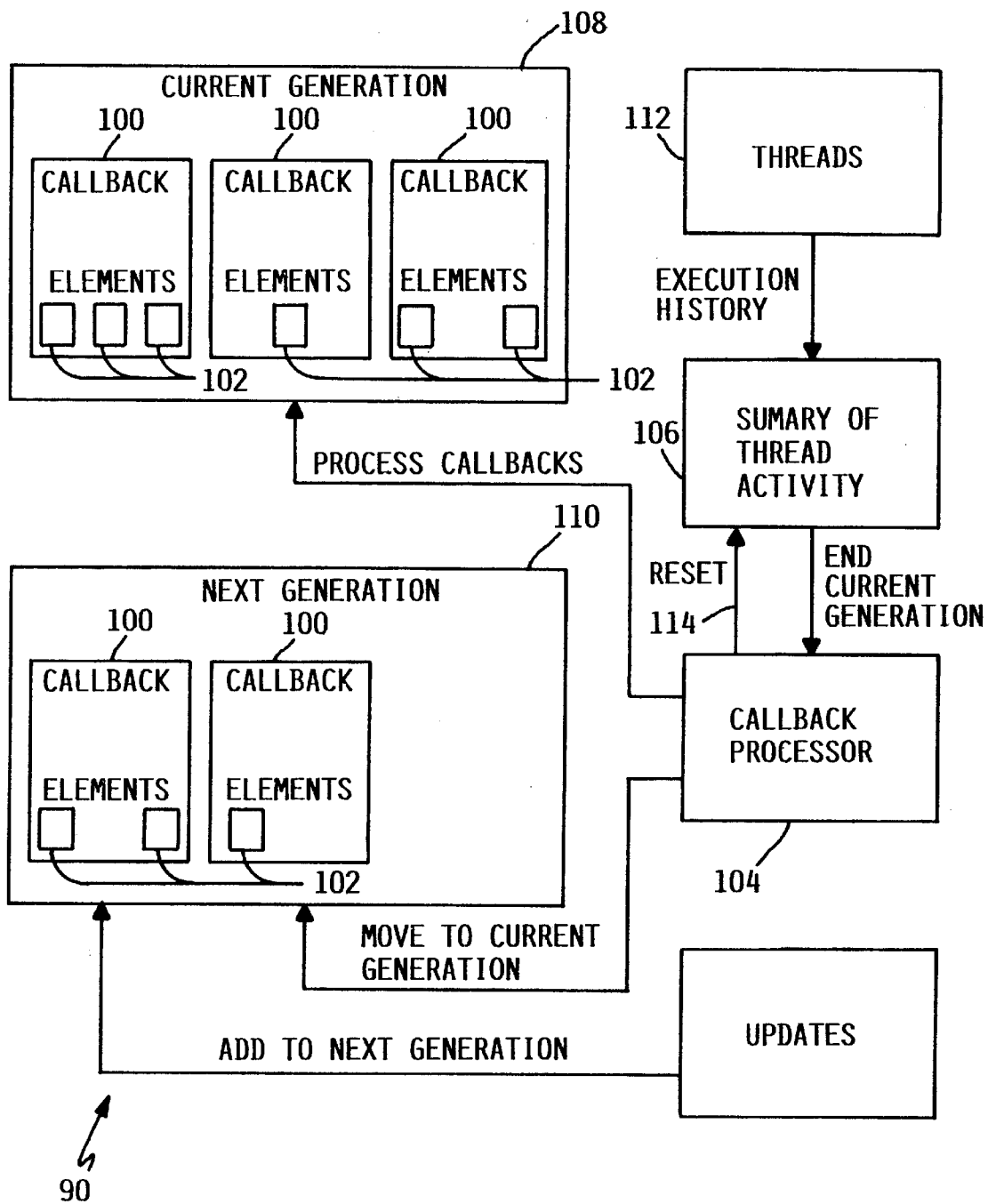
FIG. 3 is a simplified schematic block diagram showing a mutual-exclusion mechanism according to this invention.

FIG. 3 shows the interrelationship of components used to implement an embodiment of a mutual-exclusion mechanism 90. Skilled workers will recognize that terms of art used in this application are known in the computer industry. Standard C-programming language syntax is used to describe relevant data structures and variables. Pseudo-code is used to describe various operational steps. The following alphabetically arranged terms are described with reference to FIGS. 1 and 3.

A CALLBACK 100 is an element of a generation data structure. Each callback 100 tracks a set of elements 102 waiting for safe erasure. Callback 100 may include operational steps specific to a type of elements being tracked.

A CALLBACK PROCESSOR 104 is an entity that monitors a summary of thread activity 106 and processes a current generation 108 of callbacks 100 when it is safe to do so. Then, callback processor 104 causes a next generation 110 of callbacks 100 to become the current generation 108 of callbacks 100 and resets summary of thread activity 106. A global callback processor may be used to process all callbacks, or multiple callback processors may process individual elements or groups of elements protected by mutual-exclusion mechanism 90.

COMPUTER SYSTEM 14 includes computer 10 or a group of computers 10 that share or exchange information. Computers 10 may be single processors or shared-memory multiprocessors. Groups of computers 10 may be connected by interconnection network 12 to exchange data. Such data exchange includes so-called "sneakernets" that communicate by physically moving a storage medium from one computer 10 to another computer 10. Alternatively, computer system 14 can include loosely coupled multiprocessors, distributed multiprocessors, and massively parallel processors.

A DATA STRUCTURE is any entity that stores all or part of the state maintained by computer system 14. Examples of data structures include arrays, stacks, queues, singly linked linear lists, doubly linked linear lists, singly linked circular lists, doubly linked circular lists, trees, graphs, hashed lists, and heaps.

ELEMENT 102 is usually one or more contiguous records or "structs" in a data structure stored in a memory (18, 22, or 24). Examples include array elements and elements of linked data structures.

ERASE means to render the contents of element 102 invalid. Erasure may be accomplished by returning element 102 to a free pool (not shown) for initialization and reallocation, by overwriting, or by moving element 102 to another data structure. The free pool is simply a particular example of another data structure. Any special processing required by a particular element 102 is performed by its associated callback 100.

The FREE POOL is a group of elements available for addition to existing data structures or for creating new data structures. A free pool may be associated with a given data structure, a specific group of data structures, a given entity, specific groups of entities, or with all or part of an entire computer system.

A GENERATION is a set of elements 102 deleted from one or more data structures by a set of threads 112. The generation is erased when threads 112 enter a quiescent state. In particular, current generation 108 is erased when its associated threads reach a quiescent state, and next generation 110 is erased when its associated threads reach a quiescent state, but after the current generation is erased.

A GENERATION DATA STRUCTURE is a data structure that tracks a particular generation of elements waiting to be erased. Generations of elements may be tracked system-wide, per data structure, by group of data structures, by entity, or by a group of entities.

MUTEX is a term that refers to a specific instance of a mutual-exclusion mechanism as in "the data structure is protected by a per-thread mutex."

MUTUAL EXCLUSION is a property that permits multiple threads to access and/or update a given data structure or group of data structures while maintaining their integrity. For example, mutual exclusion prevents an entity from reading a given portion of a data structure while it is being updated.

MUTUAL-EXCLUSION OVERHEAD is the additional amount of processing required to operate a mutual-exclusion mechanism. The amount of overhead may be measured by comparing the "cost" of processing required to access and/or update a given data structure or group of data structures with and without the mutual-exclusion mechanism. If there is no difference in the cost, the mutual exclusion mechanism has zero overhead. An example of cost is processing time.

A READER is a thread that accesses but does not update a data structure.

A QUIESCENT STATE exists for a thread when it is known that the thread will not be accessing data structures protected by this mutual-exclusion mechanism. If multiple callback processors exist, a particular thread can be in a quiescent state with respect to one callback processor and in an active state with respect to another callback processor. Examples of quiescent states include an idle loop in an operating system, a user mode in an operating system, a context switching point in an operating system, a wait for user input in an interactive application, a wait for new messages in a message-passing system, a wait for new transactions in a transaction processing system, a wait for control input in an event-driven real-time control system, the base priority level in a interrupt-driven real-time system, an event-queue processor in a discrete-event simulation system, or an artificially created quiescent state in a system that lacks a quiescent state, such as a real-time polling process controller.

A READER-WRITER SPINLOCK is a type of spinlock that allows many readers to use a mutex simultaneously, but allows only one writer to use the mutex at any given time, and which further prevents any reader and writer from using the mutex simultaneously.

SEQUENTIAL CONSISTENCY is a property that ensures that all threads agree on a state change order. Multiprocessor computer systems do not typically depend on sequential consistency for performance reasons. For example, an INTEL® 80486 processor has a write-buffer feature that makes a data update appear to have occurred earlier in time at a particular processor than at other processors. The buffer feature causes processes relying on sequential consistency, such as locks, to either fail or to require additional work-around instructions.

A SLEEPLOCK is a type of mutual-exclusion mechanism that prevents excluded threads from processing, but which requires a pair of context switches while waiting for the sleeplock to expire.

A SPINLOCK is a type of mutual-exclusion mechanism that causes excluded threads to execute a tight loop while waiting for the spinlock to expire.

STORAGE MEDIA are physical elements such as a rotating disk or a magnetic tape that provide long-term storage of information.

A SYSTEM is a collection of hardware and software that performs a task.

A SUBSYSTEM is a part of a system that performs some part of the task.

SUMMARY OF THREAD ACTIVITY 106 is a data structure that contains a record of thread execution history that indicates to callback processor 104 when it is safe to process current generation 108 of callbacks 100.

THREAD 112 is any center of activity or concentration of control in a computer system. Examples of a thread include a processor, process, task, interrupt handler, service procedure, co-routine, transaction, or another thread that provides a given locus of control among threads sharing resources of a particular process or task.

AN UPDATER is a thread that updates a data element or a data structure.

Mutual-exclusion mechanism 90 allows multiple readers and updaters to operate concurrently without interfering with each other, although readers accessing a data structure after an updater will access the updated data structure rather than the original structure.

Mutual-exclusion mechanism 90 does not require readers to use a mutex or sequential consistency instructions. Updaters use a mutex as required by the update algorithm and use sequential consistency instructions to ensure that the readers access consistent data.

An updater deleting an element removes it from a data structure by unlinking it or using a deletion flag. If current generation 108 is empty, the updater adds a callback 100 containing the element to current generation 108 and causes callback processor 104 to reset summary of thread activity 106. If current generation 108 is not empty, the updater adds a callback 100 containing the element to next generation 110.

An updater changing an element copies it from a data structure into a new element, updates the new element, links the new element into the data structure in place of the original element, uses the callback mechanism to ensure that no threads are currently accessing the element, and erases the original element.

Some computers have features that explicitly enforce sequential consistency, such as the INTEL® 80×86 exchange instruction, MIPS® R4000 look link and store conditional instructions, IBM® RS6000 cache-management Instructions, or uncachable memory segments. In sequences of instructions not involving such features, these computers can reorder instructions and memory accesses. These features must, therefore, be used to prevent readers from accessing elements before they have been completely initialized or after they have been erased.

Updaters, whether deleting or updating data, should use some mutual-exclusion mechanism such as spinlocks or sleeplocks to prevent multiple updaters from causing incoherent data.

Using the above-described updater techniques in conjunction with mutual-exclusion mechanism 90 ensures that no thread accesses an element when it is erased.

Summary of thread activity 106 may be implemented per data structure, per group of data structures, or system-wide. Summary of thread activity 106 has many alternative data structures including those described below.

A dense per-thread bitmap data structure has an array of bits with one bit per thread. When a thread passes through a quiescent state since the data structure was reset, the corresponding bit is cleared.

A distributed per thread bitmap data structure embeds thread bits into a structure that facilitates thread creation and destruction. For example, a flag is used to track each thread in the data structure.

A hierarchical per-thread bitmap is a data structure that maintains a hierarchy of bits. The lowest level maintains one bit per thread. The next level up maintains one bit per group of threads and so on. All bits are preset to a predetermined state, for example, a one-state. When a thread is sensed in a quiescent state, its associated bit is set to a zero-state in the lowest level of the hierarchy. If all bits corresponding to threads in the same group are in a zero-state, the associated group bit in the next higher level is set to a zero-state and so on until either the top of the hierarchy or a non zero bit is encountered. This data structure efficiently tracks large numbers of threads; Massively parallel shared-memory multiprocessors should use a bitmap hierarchy mirroring their bus hierarchy.

Summary of thread activity 106 may be reset in various ways including those described below.

Each bit is explicitly set to a predetermined state, preferably a one-state, by a reset signal 114.

Each bit (or group of bits for hierarchial bitmaps) has an associated generation counter. A global generation counter is incremented to reset summary of thread activity 106. When a thread is sensed in a quiescent state, and its associated bit is currently in a zero-state, its associated generation counter is compared with the global generation counter. If the counters differ, all bits associated with the quiescent thread are set to a one-state and the associated generation counter is set to equal the global counter.

The generation counter technique efficiently tracks large numbers of threads, and is particularly useful in massively parallel shared-memory multiprocessors with hierarchical buses.

A thread counter (not shown) may be used to indicate the number of threads remaining to be sensed in a quiescent state since the last reset signal 114. The thread counter is preset to the number of threads (or for hierarchial schemes, the number of threads in a group) and is decremented each time a thread bit is cleared. When the counter reaches zero, all threads have been sensed in a quiescent state since the last reset. If threads can be created and destroyed, the counters corresponding to the threads being destroyed must be decremented.

Callback processor 104 interfaces with the quiescence-indicating scheme chosen for summary of thread activity 106 and therefore has various possible implementations. For example, if the quiescence-indicating bits in summary of thread activity 106 have other purposes, no additional overhead need be incurred by callback processor 104 in checking them. Consider a data structure having a dedicated summary of thread activity and a per-thread bit for indicating the occurrence of some unusual condition. Any thread accessing the data structure must execute special-case steps in response to the per-thread bit such as recording its quiescence before accessing the data structure.

Callback processor 104 may be invoked by:

all threads upon entering or exiting their quiescent state;

readers just before or just after accessing the data structure protected by mutual-exclusion mechanism 90 (invoking callback processor 104 just after accessing the data structure will incur overhead unless the quiescence-indicating bits in summary of thread activity 106 have multiple purposes);

a separate entity such as an interrupt, asynchronous trap signal, or similar facility that senses if the thread is in a quiescent state; or updaters, the form of which varies from system to system.

If an updater has a user process context on a shared memory multiprocessor, the updater forces a corresponding process to run on each processor which forces each processor through a quiescent state, thereby allowing the updater to safely erase the elements.

In a message passing system, an updater may send a message to each thread that causes the thread to pass through a quiescent state. When the updater receives replies to all the messages, it may safely erase its elements. This alternative is attractive because it avoids maintaining lists of elements awaiting erasure. However, the overhead associated with message-passing and context switching overwhelms this advantage in many systems.

Callbacks and generations may be processed globally, per-thread where possible, or per some other entity where possible. Global processing is simple to implement, whereas the other choices provide greater updating efficiency. Implementations that allow threads to be destroyed, such as a processor taken off line, will need to include global callback processing to handle those callbacks waiting for a recently destroyed thread.

Figure 4:
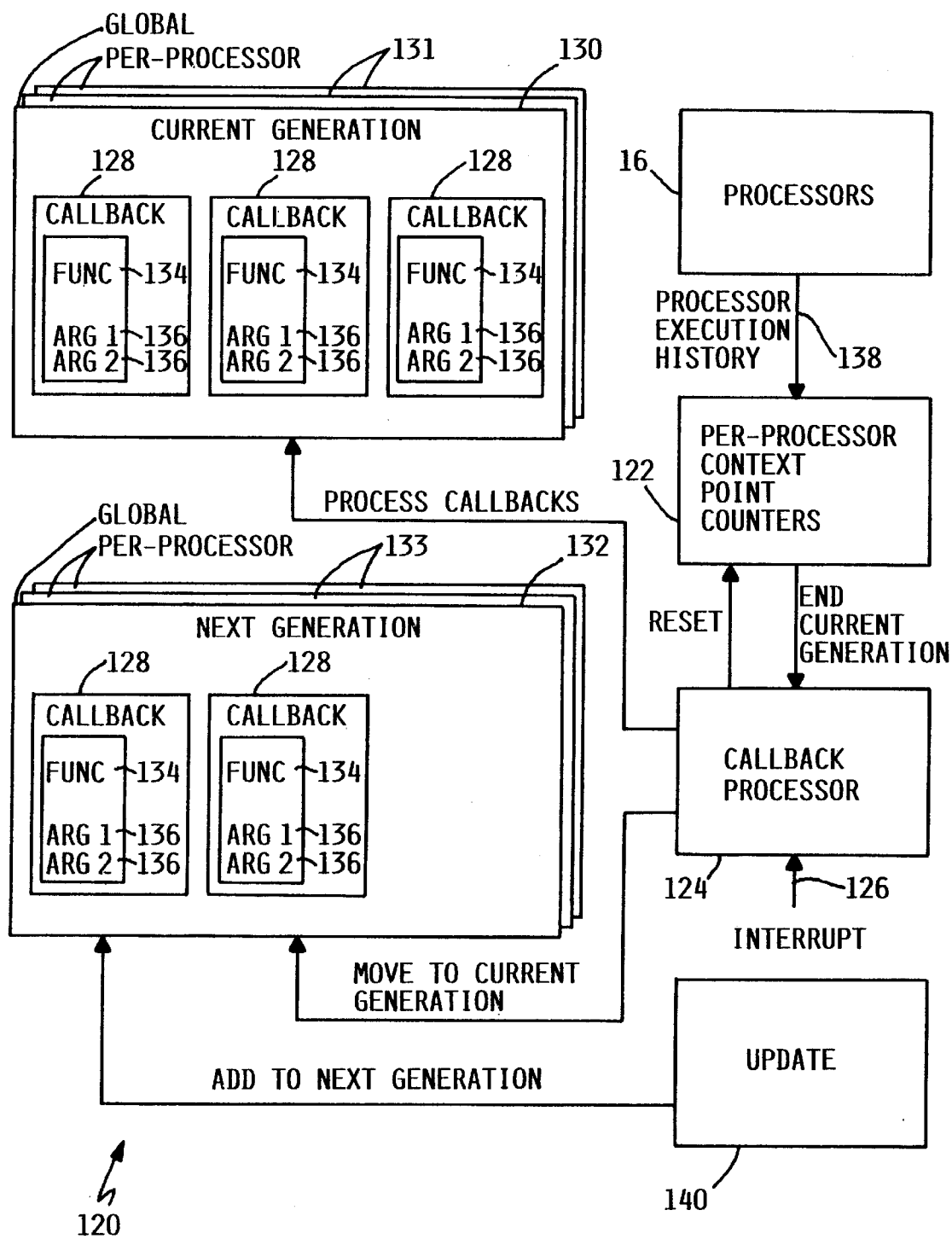
FIG. 4 is a simplified schematic block diagram showing a preferred implementation of the mutual-exclusion mechanism of FIG. 3.

Referring to FIG. 4, a preferred mutual-exclusion mechanism 120 is implemented in the Symmetry Series of computers manufactured by the assignee of this invention. The operating system is a UNIX® kernel running on a shared-memory symmetrical multiprocessor like computer 10 shown in FIG. 1B.

Figure 2:
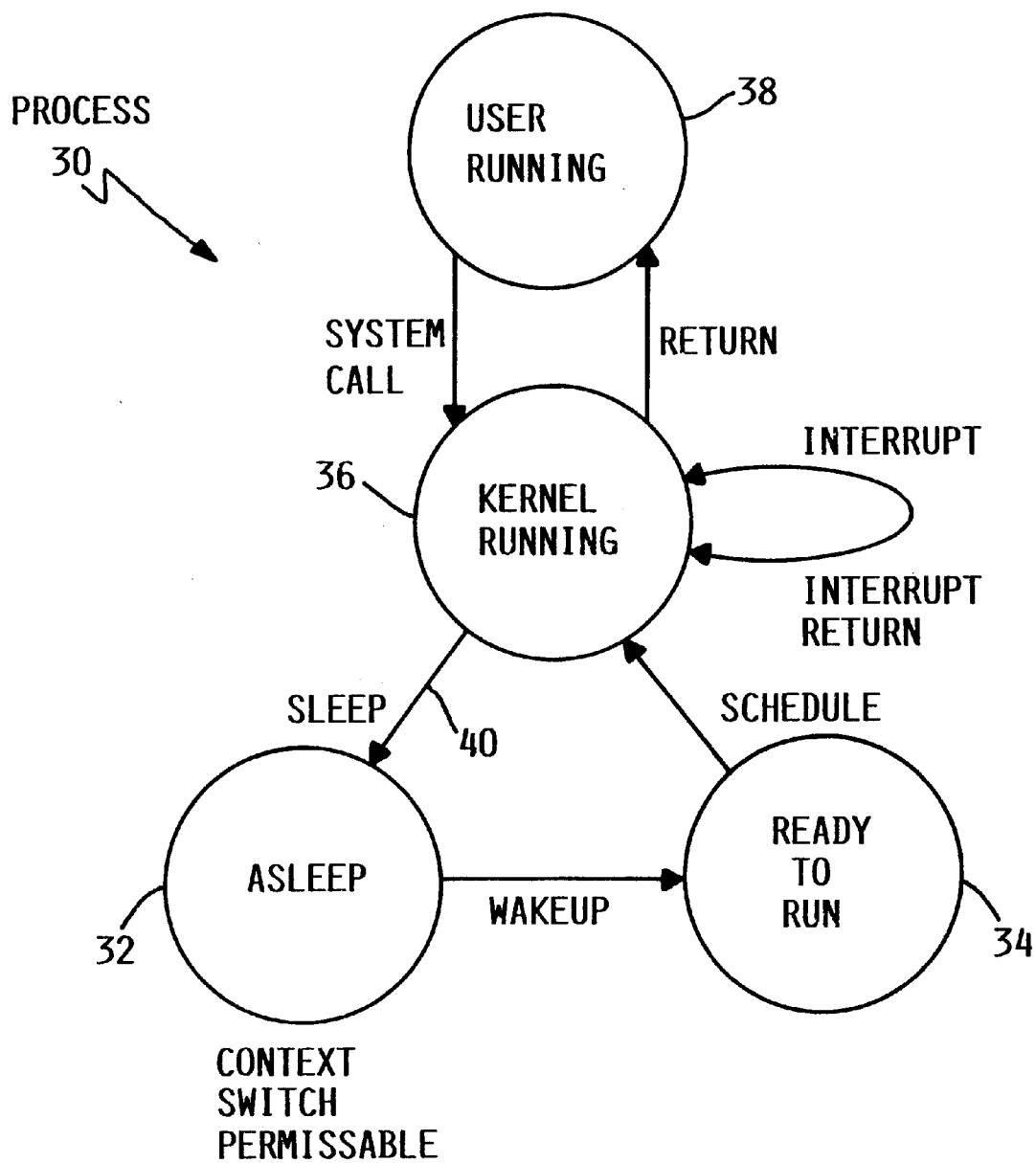
FIG. 2 is a simplified state diagram showing the interrelationship of process states and process state transitions followed during execution of the process in a prior art UNIX® operating system.

Mutual-exclusion mechanism 120 has a system-wide scope in which each thread corresponds to an interrupt routine or kernel running state 36 (FIG. 2) of a user process. Alternatively, each of processors 16 may correspond to threads 112 (FIG. 3). Quiescent state alternatives include an idle loop, process user running state 38 (FIG. 2), a context switch point such as process asleep state 32 (FIG. 2), initiation of a system call, and a trap from a user mode. More than one type of quiescent state may be used to implement mutual-exclusion mechanism 120.

The summary of thread activity is implemented by per-processor context-point counters 122. Counters 122 are incremented each time an associated processor 16 switches context. Counters 122 are used by other subsystems and therefore add no overhead to mutual-exclusion mechanism 120.

A callback processor 124 includes a one-bit-per processor bitmask. Each bit indicates whether its associated processor 16 must be sensed in a quiescent state before the current generation can end. Each bit corresponds to a currently functioning processor and is set at the beginning of each generation. When each processor 16 senses the beginning of a new generation, its associated per-processor context switch counter 122 value is saved. As soon as the current value differs from the saved value, the associated bitmask bit is cleared indicating that the associated processor 16 is ready for the next generation.

Callback processor 124 is preferably invoked by a periodic scheduling interrupt 126. Processor 16 may alternatively clear its bitmask bit if scheduling interrupt 126 is in response to an idle loop, a user-level process execution, or a processor 16 being placed off line. The latter case is necessary to prevent an off line processor from stalling the callback mechanism and causing a deadlock.

When all bits in the bitmask are cleared, callback processor 124 processes all callbacks 128 in a global current generation 130 and all callbacks 128 associated with the current processor in a per-processor current generation 131.

Mutual-exclusion mechanism 120 also includes a global next generation 132 and a per-processor next generation 133. When a particular processor 16 is placed off line, all callbacks 128 in its associated per-processor current generation 131 and per-processor next generation 133 are placed in global next generation 132 to prevent callbacks 128 from being "stranded" while the processor is off line.

Mutual-exclusion mechanism 120 implements callbacks 128 with data structures referred to as rc_callback_t and rc_ctrlblk_t and the below-described per-processor variables.

cswtchctr: A context switch counter that is incremented for each context switch occurring on a corresponding processor.

syscall: A counter that is incremented at the start of each system call initiated on a corresponding processor.

usertrap: A counter that is incremented for each trap from a user mode occurring on a corresponding processor.

rclockcswtchctr: A copy of the cswtchctr variable that is taken at the start of each generation.

rclocksyscall: A copy of the syscall variable that is taken at the start of each generation.

rclockusertrap: A copy of the usertrap variable that is taken at the start of each generation.

rclockgen: A generation counter that tracks a global generation number. This variable indicates whether a corresponding processor has started processing a current generation and if any previous generation callbacks remain to be processed.

rclocknxtlist: A per-processor list of next generation callbacks comprising per-processor next generation 133.

rclocknxttail: A tail pointer pointing to rclocknxtlist.

rclockcurlist: A per-processor list of current generation callbacks comprising per-processor current generation 131.

rclockcurtail: A tail pointer pointing to rclockcurlist.

rclockintrlist: A list of callbacks in the previous generation that are processed by an interrupt routine which facilitates processing them at a lower interrupt level.

rclockintrtail: A tail pointer pointing to rclockintrlist.

A separate copy of data structure rc_callback_t exists for each callback 128 shown in FIG. 4. The rc_callback_t data structure is described by the following C-code:

```
typedef struct rc_callback rc_callback_t;
struct rc_callback (
        rc_callback_t *rcc_next;
        void    (*rcc_callback) (rc_callback_t *rc,
                void *arg1,
                void *arg2);
        void    *rcc_arg1;
        void    *rcc_arg2;
        char    rcc_flags;
);
``` where:
rcc_next links together a list of callbacks associated with a given generation;
rcc_callback specifies a function 134 to be invoked when the callback generation ends;
rcc_arg1 and rcc_arg2 are arguments 136 passed to rcc_callback function 134; and
rcc_flags contains flags that prevent callbacks from being repeatedly associated with a processor, and that associate the callbacks with a memory pool.

The first argument in function 134 is a callback address. Function 134 is responsible for disposing of the rc_callback_t data structure.

Mutual-exclusion mechanism 120 implements global current generation 130, per-processor current generation 131, global next generation 132, and per-processor next generation 133 of callbacks 128 with a data structure referred to as rc_ctrlblk_t that is defined by the following C-code:

```
typedef struct rc_ctrlblk (
    /* Control variables for rclock callback. */
    gate_t          rcc_mutex;
    rc_gen_t        rcc_curgen;
    rc_gen_t        rcc_maxgen;
    engmask_t       rcc_olmsk;
    engmask_t       rcc_needctxmask;
    rc_callback_t   *rcc_intrlist;
    rc_callback_t   **rcc_intrtail;
    rc_callback_t   *rcc_curlist;
    rc_callback_t   **rcc_curtail;
    rc_callback_t   *rcc_nxtlist;
    rc_callback_t   **rcc_nxttail;
    mp_ctr_t        *rcc_nreg;
    mp_ctr_t        *rcc_nchk;
    mp_ctr_t        *rcc_nprc;
    mp_ctr_t        *rcc_ntogbl;
    mp_ctr_t        *rcc_npregbl;
    mp_ctr_t        *rcc_nsync;
    rc_callback_t   *rcc_free;
) rc_ctrlblk_t;
``` where:
rcc_mutex is a spin lock that protects the callback data structure (rcc_mutex is not used by readers, and therefore, does not cause additional overhead for readers);
rcc_curgen contains a number of callbacks 128 in global current generation 130;
rcc_maxgen contains a largest number of callbacks 128 in any next generation 132, 133 of callbacks 128 (when rcc_curgen is one greater than rcc_maxgen, there are no outstanding callbacks 128);
rcc_olmsk is a bitmask in which each bit indicates whether a corresponding processor 16 is on line;

rcc_needctxtmask is a field implementing summary of execution history 138 (the field is a bitmask in which each bit indicates whether a corresponding processor 16 has been sensed in a quiescent state);

rcc_intrlist is a pointer to a linked list of rcc_callback_t elements waiting to be processed in response to a software interrupt;

rcc_intrtail is a tail pointer to the rcc_intrlist pointer;

rcc_curlist is a pointer to a linked list of rcc_callback_t elements that together with per-processor variable rclockcurlist implement global current generation 130 and per-processor current generation 131;

rcc_curtail is a tail pointer to the rcc_curlist pointer;

rcc_nxtlist is a pointer to a linked list of rcc_callback_t elements that together with per-processor variable rclocknxtlist implement global next generation 132 and per-processor next generation 133;

rcc_nxttail is a tail pointer to the rcc_nxtlist pointer (note that per-processor lists are used wherever possible, and global lists are used only when a processor having outstanding callbacks is taken off line);

rcc_nreg is a counter field that counts the number of "registered" callbacks (a registered callback is one presented to mutual exclusion mechanism 120 for processing);

rcc_nchk is a counter field that counts the number of times a rc_chk_callbacks function has been invoked;

rcc_nprc is a counter field that counts the number of callbacks that have been processed;

rcc_ntogbl is a counter field that counts the number of times that callbacks have been moved from a per-processor list to a global list;

rcc_nprcgbl is a counter field that counts the number of callbacks that have been processed from the global list;

rcc_nsync is a counter field that counts the number of memory-to-system synchronization operations that have been explicitly invoked; and rcc_free is a pointer to a list of currently unused callback data structures that cannot be freed because they are allocated in permanent memory.

Function rc_callback performs an update 140 using a single rc_callback_t as its argument. Update 140 adds callbacks to global next generation 132 and per-processor next generation 133 by executing the following pseudo-code steps:

--- if a pending callback is already registered, flag an error;
if the pending callback is not registered, flag the callback as registered;
increment counter rcc_nreg;
if the current processor is on line:
    disable interrupts;
    add the callback to the rclocknxtlist per-processor list;
    enable interrupts; and
    return (do not execute the following steps).

---

If the current processor is off line (a paradoxical situation that can arise during the process of changing between on line and off line states):

acquire rcc_mutex to protect rc_ctrlblk_t from concurrent access;

add the callback to global list rcc_nxtlist;

invoke rc_reg_gen (described below) to register that at least one additional generation must be processed (This step is not performed in the above-described per-processor case, but is performed by rc_chk_callbacks in response to the next clock interrupt); and release rcc_mutex.

Callback processor 124 is implemented by a function referred to as rc_chk_callbacks. Callback processor 124 is invoked by interrupt 126, which is preferably a hardware scheduling clock interrupt referred to as hardclock(), but only if one or more of the following conditions are met: rclocknxtlist is not empty and rclockcurlist is empty (indicating that the current processor is tracking a generation of callbacks and there are callbacks ready to join a next generation); rclockcurlist is not empty and the corresponding generation has completed; or the bit in rcc_needctxtmask that is associated with the current processor is set. The latter condition ensures that if there is a current generation of callbacks, the current processor must be in, or have passed through, a quiescent state before the generation can end.

Function rc_chk_callbacks has a single flag argument that is set if interrupt 126 is received during an idle loop or a user mode, both of which are quiescent states from the viewpoint of a kernel thread. Function rc_chk_callbacks executes the following pseudo-code steps:

increment the counter rcc_nchk; if rclockcurlist has callbacks and rclockgen indicates their generation has completed, append the callbacks in rclockcurlist to any callbacks listed in rclockintrlist;

if rclockintrlist is empty, send a software interrupt to the current processor to process the appended callbacks;

if rclockcurlist is empty and rclocknxtlist is not empty, move the contents of rclocknxtlist to rclockcurlist, set rclockgen to one greater than rcc_curgen, and invoke rc_reg_gen on the value in rclockgen;

if the bit in rcc_needctxtmask corresponding to the current processor is not set, return (do not execute the following steps);

if the argument is not set (i.e., hardclock() did not interrupt either an idle-loop or a user code quiescent state) and rclockcswtchctr contains an invalid value, store in rclockcswtchctr, rclocksyscall, and rclockusertrap the current values of cswtchctr, syscall, and usertrap associated with the current processor, and return;

if the argument is not set and counters cswtchctr, syscall, and usertrap associated with the current processor have not changed (checked by comparing with the variables rclockcswtchctr, rclocksyscall, and rclockusertrap), return;

acquire rcc_mutex; and invoke a function referred to as rc_cleanup (described below) to invoke the callbacks and release rcc_mutex.

Function rc_cleanup ends global current generation 130 and per-processor current generation 131 and, if appropriate, starts a new generation. The rcc_mutex must be held when entering and released prior to exiting rc_cleanup. Function rc_cleanup executes the following pseudo-code steps:

if the bit in rcc_needctxtmask associated with the current processor is already cleared, release rcc_mutex and return;

clear the bit in rcc_needctxtmask associated with the current processor to indicate that the current processor has completed the current generation;

set rclockcswtchctr to an invalid value;

if any bit in rcc_needctxtmask is still set, release rcc_mutex and return;

increment rcc_curgen to advance to the next generation;

if rcc_curlist is not empty, move its callbacks to rcc_intrtail;

if rcc_nxtlist is not empty, move its callbacks to rcc_curlist and invoke rc_reg_gen to indicate that another generation is required;

otherwise, invoke rc_reg_gen with rcc_maxgen to begin the next generation if appropriate;

if rcc_intrlist is not empty, send a software interrupt to cause its callbacks to be processed; and release rcc_mutex.

A function referred to as rc_intr, invoked in response to the software interrupt, processes all callbacks in rcc_intrlist and those in rclockintrlist that are associated with the current processor. Function rc_intr executes the following steps:

while rclockintrlist is not empty, execute the following steps:
 disable interrupts;
 remove the first callback from rclockintrlist and flag the callback as not registered;
 enable interrupts;
 invoke the callback; and
 increment the rcc_nprc counter.

While rcc_intrlist is not empty, execute the following steps:
 acquire rcc_mutex;
 remove the first callback from rcc_intrlist and flag the callback as not registered;
 release rcc_mutex;
 invoke the callback; and
 increment the rcc_nprc and rcc_nprcgbl counters.

A function referred to as rc_onoff is invoked whenever any of processors 16 are taken off line or placed on line. Function rc_onoff prevents mutual-exclusion mechanism 120 from waiting forever for a disabled processor to take action. Function rc_onoff executes the following pseudo-code steps:

acquire rcc_mutex;

update rcc_olmsk to reflect which processors 16 are on line;

if the current processor is coming on line, release rcc_mutex and return;

if rclockintrlist, rclockcurlist, or rclocknxtlist associated with the current processor are not empty, increment counter rcc_ntogbl;

if rclockintrlist associated with the current processor is not empty, move its callbacks to the global rcc_intrlist and broadcast a software interrupt to all processors;

if rclockcurlist associated with the current processor is not empty, move its callbacks to the global rcc_nxtlist;

if rclocknxtlist associated with the current processor is not empty, move its callbacks to the global rcc_nxtlist; and invoke rc_cleanup causing the current processor to properly exit from any ongoing generation.

The function referred to as rc_reg_gen registers and starts a specified generation of callbacks if there is no active generation and if the currently registered generation has not completed. The rc_reg_gen function executes the following steps:

if the specified generation is greater than rcc_maxgen, record it in rcc_maxgen;

if rcc_needctxtmask has a bit set (current generation not complete) or if rcc_maxgen is less than rcc_curgen (specified generation complete), return; and set rcc_needctxtmask to rcc_olmsk to start a new generation.

Various uses exist for mutual-exclusion mechanism 90 in addition to the above-described generalized system-wide application.

For example, mutual-exclusion mechanism 90 provides update protection for a current local area network ("LAN") data structure 150 that distributes data packets among an array of LANS. Note that such update protection may also be extended to a wide area network ("WAN").

If a LAN is installed or removed (or is sensed as defective), data structure 150 is so informed by a function referred to as LAN-update which performs an updating sequence shown in FIGS. 5A, 5B, 5C, and 5D.

Figure 5A:
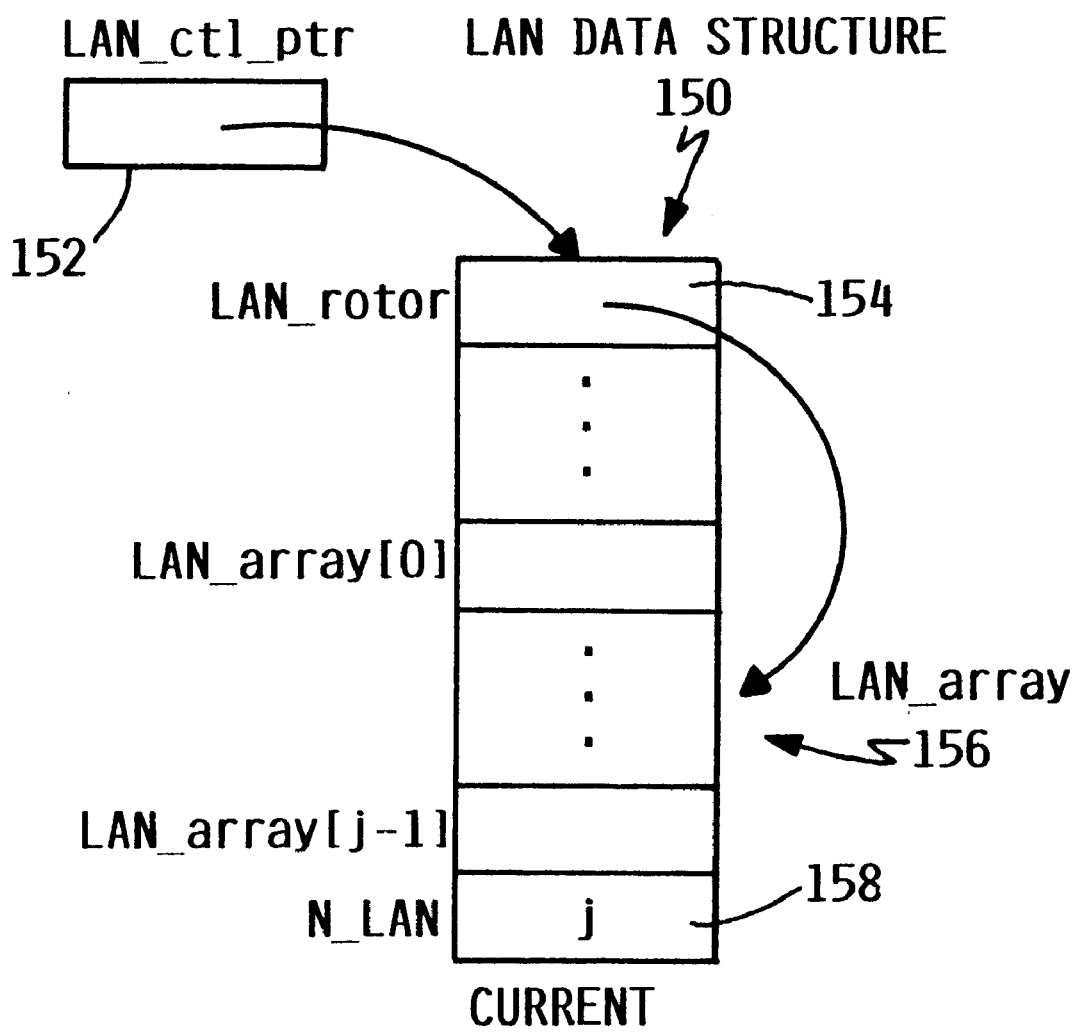
FIGS. 5A, 5B, 5C, and 5D are simplified schematic block diagrams showing four evolutionary stages of a local area network data structure being updated in a manner according to this invention.

FIG. 5A shows a current generation of LAN data structure 150 prior to the update. A pointer referred to as LAN_ctl_ptr 152 accesses a field referred to as LAN_rotor 154 that indexes into an array LAN_array 156 having "j" slots. LAN_rotor 154 is incremented each time a data packet is distributed to sequentially access each slot of LAN_array 156. LAN_rotor 154 cycles back to zero after reaching the value "j" stored in a slot N_LAN 158. The value stored in N_LAN 158 is the number of LANs available in the array.

Figure 5B:
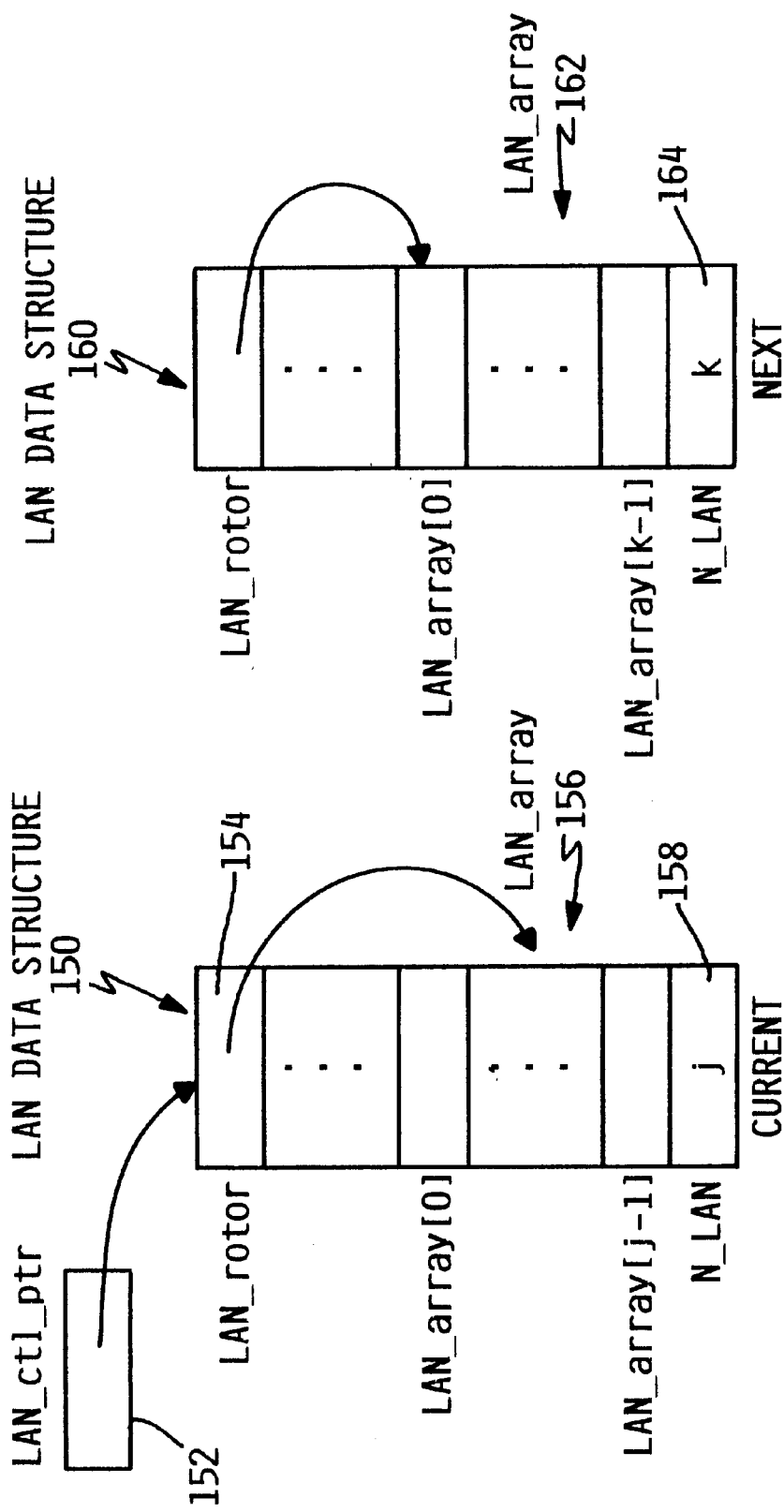

FIG. 5B shows the current generation of LAN data structure 150 immediately before updating LAN_array 156 to reflect newly installed or removed LANs. A next generation of LAN data structure 160 is allocated and initialized having an array LAN_array 162 of "j" slots. The value "j" is stored in a slot N_LAN 164. LAN_array 162 reflects the updated LAN configuration.

Figure 5C:
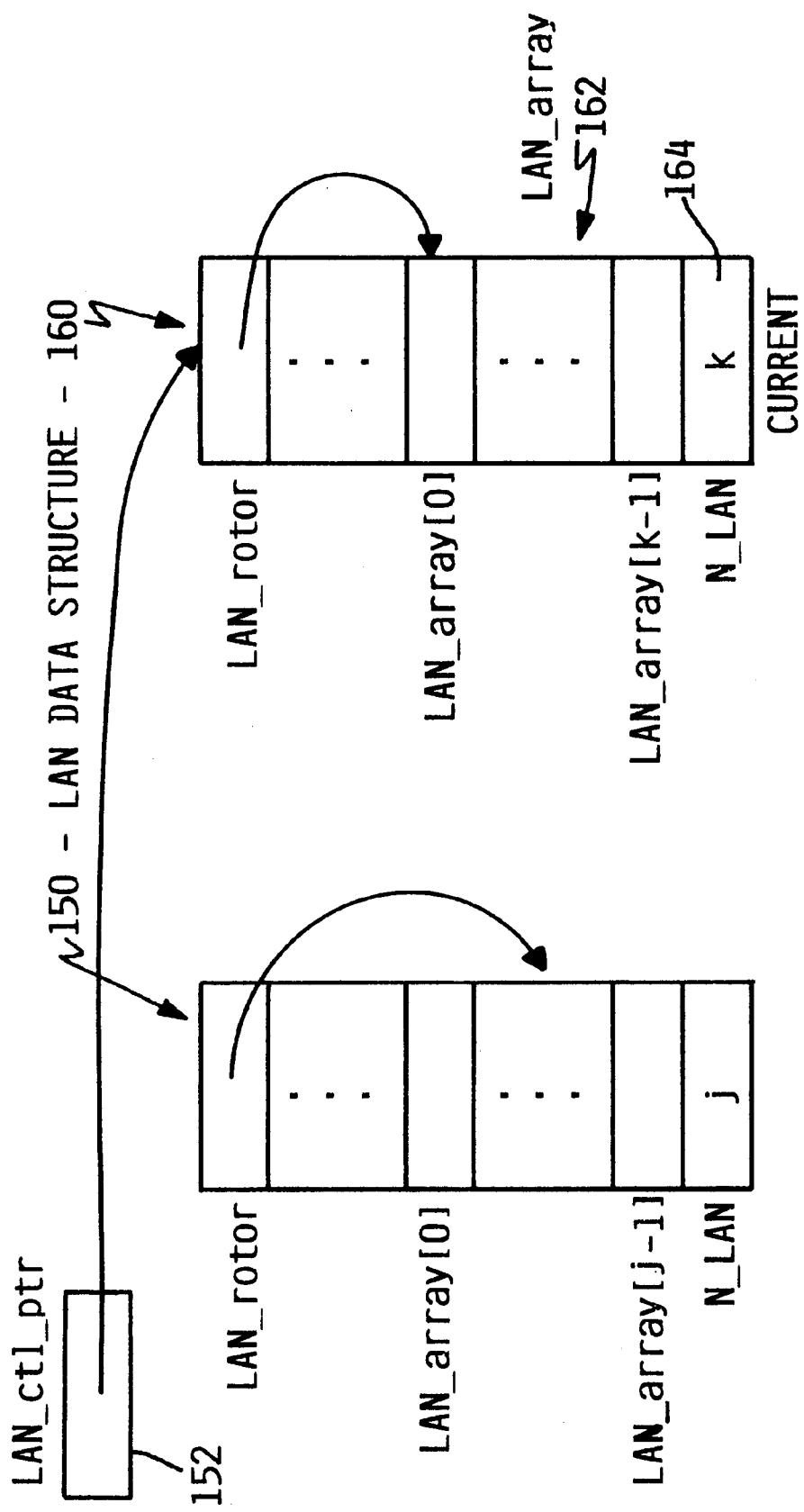

FIG. 5C shows LAN data structure 160 being installed as the current generation by overwriting LAN_ctl_ptr 152 with an address that points to LAN data structure 160 in place of LAN data structure 150. Processors that received a copy of LAN_ctl_ptr 152 before it was overwritten can safely continue to use LAN data structure 150 because all the resources it uses are permanently allocated. LAN data structure 150 will be released for deallocation after all the processors have sensed and are using LAN data structure 160.

Figure 5D:
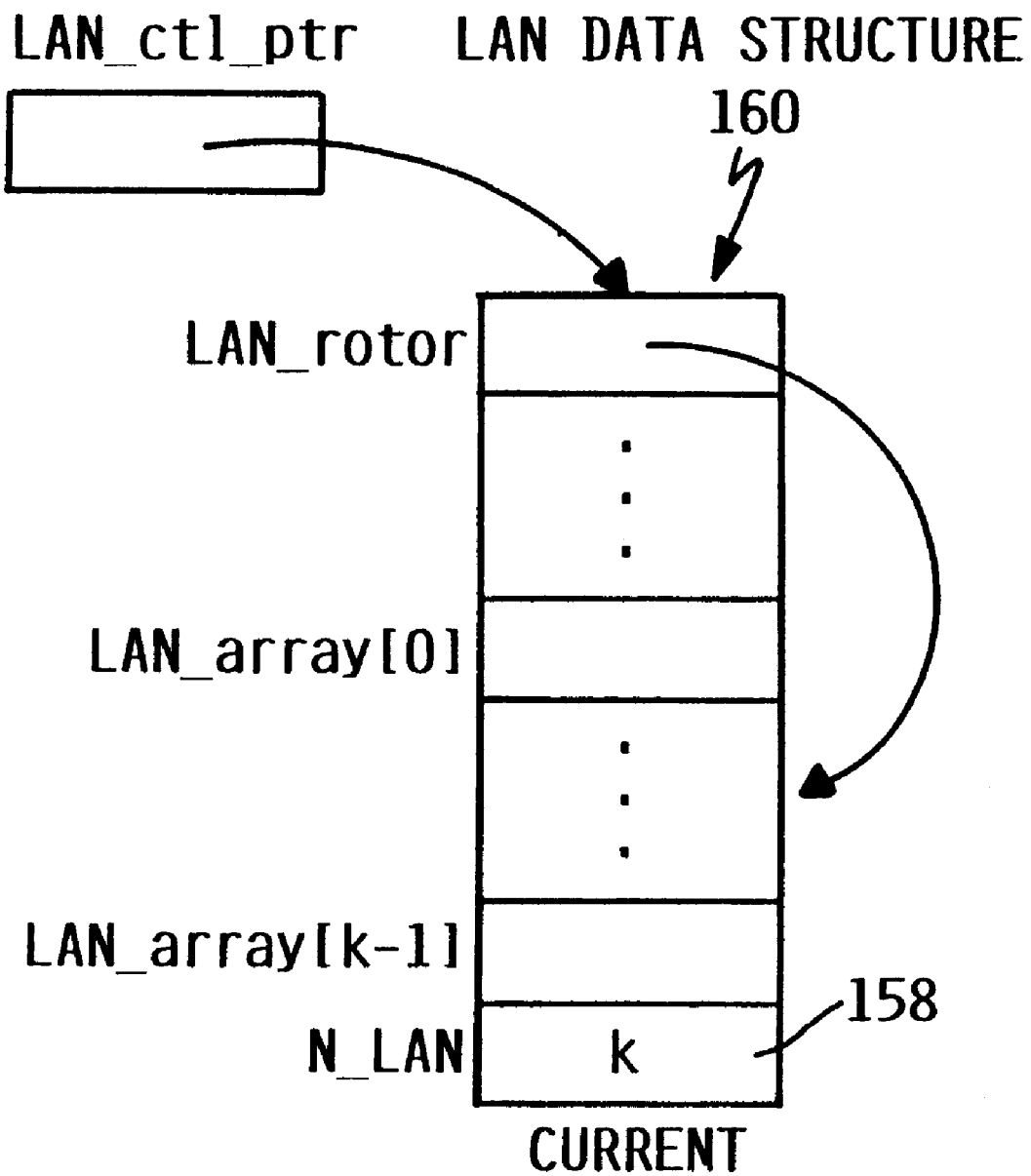

FIG. 5D shows the current generation of LAN data structure 160 in operation. LAN data structure 150 is no longer shown because it is deallocated.

Another use for mutual-exclusion mechanism 90 entails mapping "lock handles" in a network-wide distributed lock manager ("DLM") application. The DLM coordinates lock access among the nodes in the network.

Conventionally, a process in a local node uses a lock operation to "open" a lock against a resource in a remote node. A lock handle is returned by the remote node that is used in subsequent operations. For each lock operation, the lock handle must be mapped to an appropriate DLM internal data structure. On a symmetrical multiprocessor, mapping is protected by some form of conventional spin lock, sleep lock, or reader-writer spin lock that prevents the mapping from changing during use. Likewise, the data structure to which the lock handle is mapped is locked to prevent it from deletion during use. Therefore, at least two lock operations are required to map the lock handle to the appropriate data structure.

By using a zero overhead mutual-exclusion mechanism according to this invention, the DLM is able to map lock handles without using conventional locks, thereby reducing the number of remaining lock operations to one for data structure protection only.

The zero overhead mutual-exclusion mechanism provides stable lock handle mapping while the number of lock handles is being expanded and prevents data structures from being deallocated while still in use by a thread.

Figure 6:
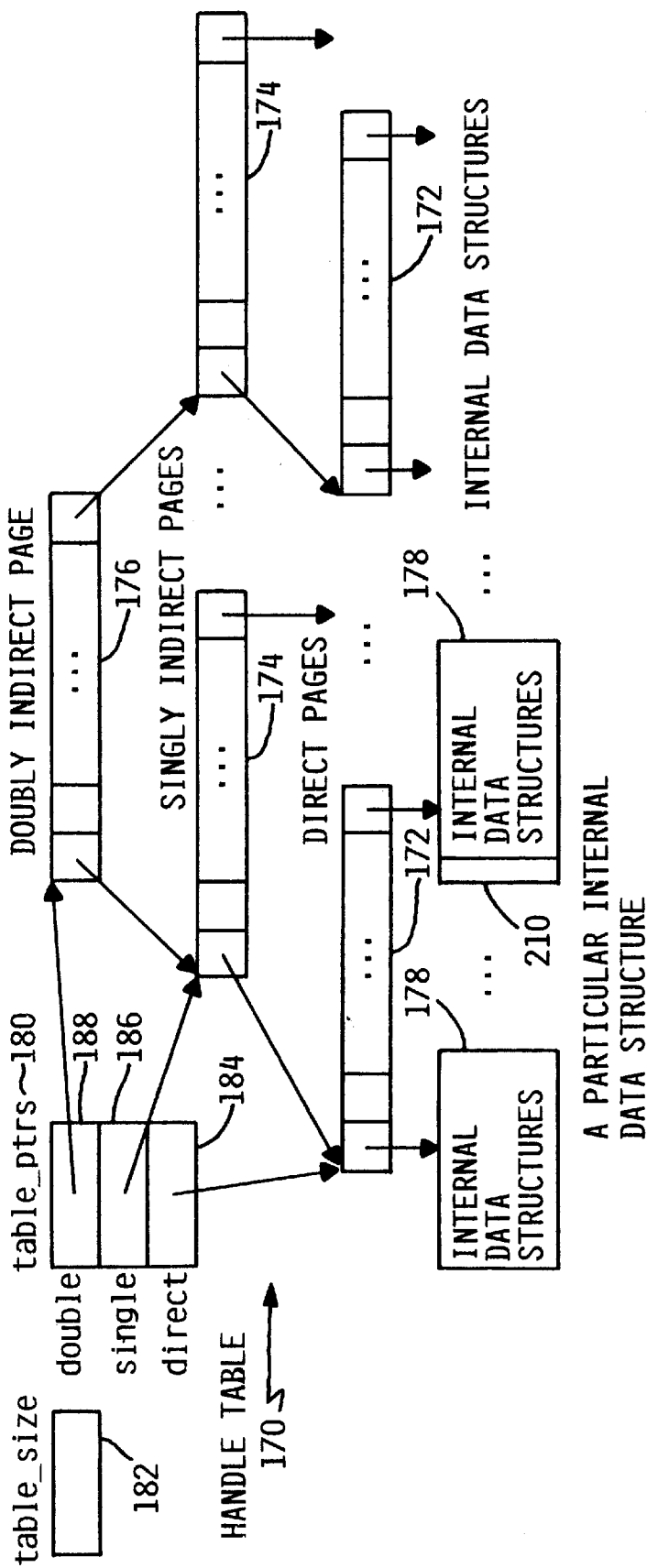
FIG. 6 is a simplified block diagram showing a handle table data structure according to this invention.

Referring to FIG. 6, lock handles are stored in a handle table 170 that has a hierarchy of direct 172, singly indirect 174, and doubly indirect 176 memory pages. Handle table 170 is expanded in a manner that allows existing lock handles to continue using handle table 170 without having their mapping changed by table expansion.

Direct 172, singly indirect 174, and doubly indirect 176 memory pages are each capable of storing NENTRIES pointers to internal data structures 178 or pointers to other memory pages.

Mapping a lock handle to its associated internal data structure entails tracing a path originating with pointers stored in a root structure 180 referred to as table_ptrs. The path followed is determined by either a directory referred to as table_size or by the lock handle itself.

If a lock handle is greater than zero but less than NENTRIES, the lock handle pointer is stored in a direct root structure field 184 referred to as table_ptrs[direct] and is directly mapped to its associated data structure 178 by table_ptrs[direct] [handle].

If a lock handle is greater than or equal to NENTRIES and less than NENTRIES*NENTRIES, the lock handle pointer is stored in a single root structure field 186 referred to as table_ptrs[single] and is indirectly mapped to its associated data structure 178 by table_ptrs[single] [handle/NENTRIES] [handle%NENTRIES] ("/" and "%" are respectively divide and modulo operators).

If a lock handle is greater than or equal to NENTRIES*NENTRIES and less than NENTRIES^3 ("*" and "^" are respectively multiply and exponent operators), the handle pointer is stored in a double root structure field 188 referred to as table_ptrs[double] and is double indirectly mapped to its associated data structure 178 by table_ptrs[double] [handle/(NENTRIES*NENTRIES)] [(handle/NENTRIES)%NENTRIES] [handle%NENTRIES].

Mapping computations are reduced to logical right shift and logical "AND" operations when NENTRIES is a power of two, which is typically the case.

Handle table 170 accommodates NENTRIES^3 lock handles. A computer, such as computer 10, typically has a 32-bit (2^32) wide address bus which is sufficient to address 1024 NENTRIES (1024^3 =2^30). Therefore, handle table 170 is adequately sized for all practical applications.

Figure 7:
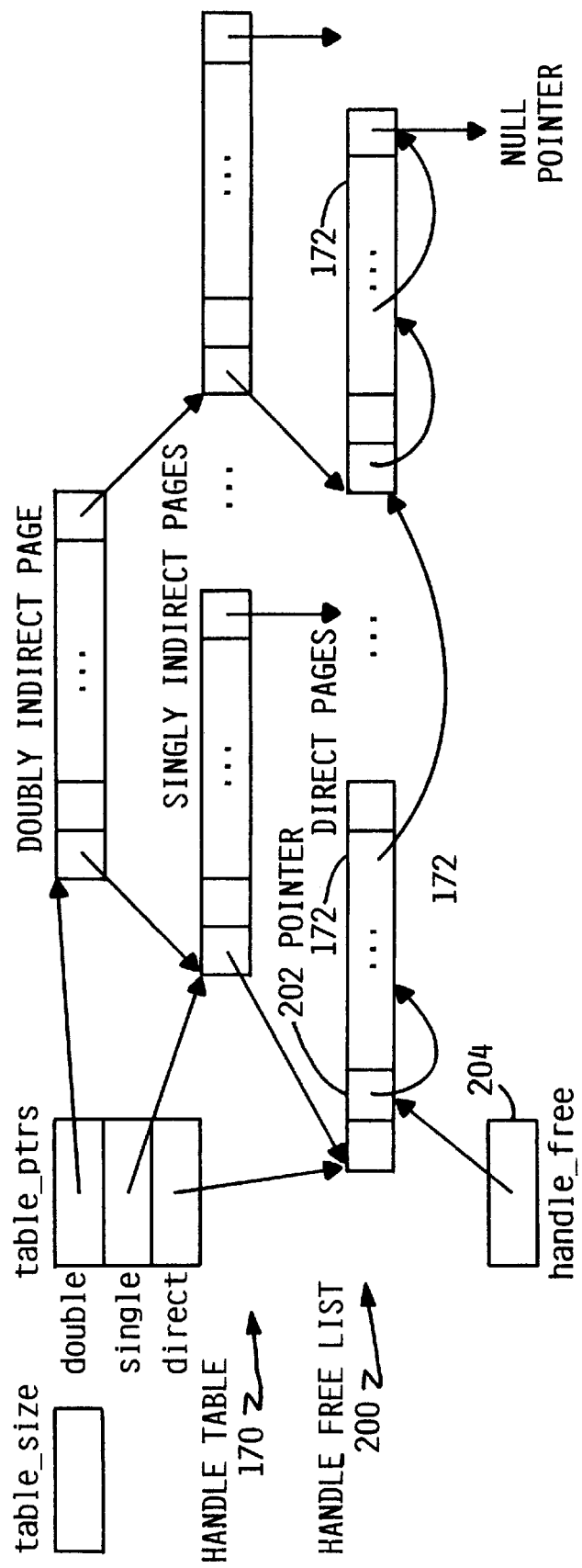
FIG. 7 is a simplified block diagram showing a free handle list data structure according to this invention.

FIG. 7 shows a handle-free list 200 that links together lock handles that are available for allocation. A free lock handle is indicated by using a pointer 202 in direct pages 172 to store an index of the next free handle via forward links of linked list 200. The index of the first free handle is stored in a handle_free header 204.

Referring again to FIG. 6, when handle table 170 is expanded, additional levels of indirection are introduced if the number of lock handles increases from NENTRIES to NENTRIES+1 or from NENTRIES^2 to (NENTRIES^2)+1. Readers can use handle table 170 while it is being expanded.

Table expansion, lock handle allocation, lock handle association with a particular internal data structure 210, and subsequent lock handle deallocation still use spin locks to maintain sequential consistency.

A newly allocated lock handle is associated with a data structure 210 by storing a pointer to data structure 210 in a location in handle table 170 associated with the newly allocated lock handle.

After a particular lock handle is mapped to data structure 210, data structure 210 must not be deallocated while being used by an unlocked reader.

Updaters using internal data structure 210 use a spin lock to protect the data structure. However, the below-described data structure deallocation process uses the same spin lock, thereby reducing deallocation process overhead.

To deallocate data structure 210, it is first disassociated with its corresponding lock handle by linking the lock handle back on handle-free list 200. A reader attempting to use data structure 210 during lock handle disassociation will encounter either the next entry in handle-free list 200 or a pointer to data structure 210. Free list 200 entries are distinguished from internal data structure pointers by examining a bit alignment of the returned value. In this implementation, internal data structure pointers are aligned on a 4-byte boundary by setting their least significant two bits to zero, whereas handle-free list entries have their least significant pointer bit set to one (the associated lock handle index is shifted left one position to compensate). Therefore, a reader encountering a value with the least significant bit set knows that the associated lock handle does not correspond to internal data structure 210.

A reader encountering data structure 210 locks data structure 210 and checks a flag word embedded in data structure 210. When data structure 210 is prepared for deallocation, a "DEAD" flag bit is set therein, and data structure 210 is placed on a "pending deallocation" list of data structures. The DEAD flag bit is set under protection of a per-data structure lock.

The reader encounter data structure 210 with the DEAD flag bit set informs its controlling process that data structure 210 is pending deallocation. In this implementation, a lookup routine uses the existing per-data structure lock upon sensing the DEAD bit set, releases the lock, and informs its controlling process that the lock handle is no longer associated with an active internal data structure.

Referring again to FIG. 3, a further use for mutual-exclusion mechanism 90 is for maintaining data coherency in an interactive user application that executes multiple processes and shares memory.

In this application, each thread corresponds to a user process, and the quiescent state is a process waiting for user input.

This implementation has a system-wide scope and preferably uses a hierarchical per-thread bitmap, per-level generation counters, a global generation counter, and a thread counter to track the execution histories of a possible large number of processes. The thread counter is decremented when a process exits. If processes can abort, the thread counter must be periodically reset to the current number of threads to prevent indefinite postponement of callback processing.

In this application, the callback processor is invoked by any thread that enters a quiescent state. However, because a user can fail to provide input to a process, a periodic interrupt should also be used to invoke the callback processor.

Figure 1A:
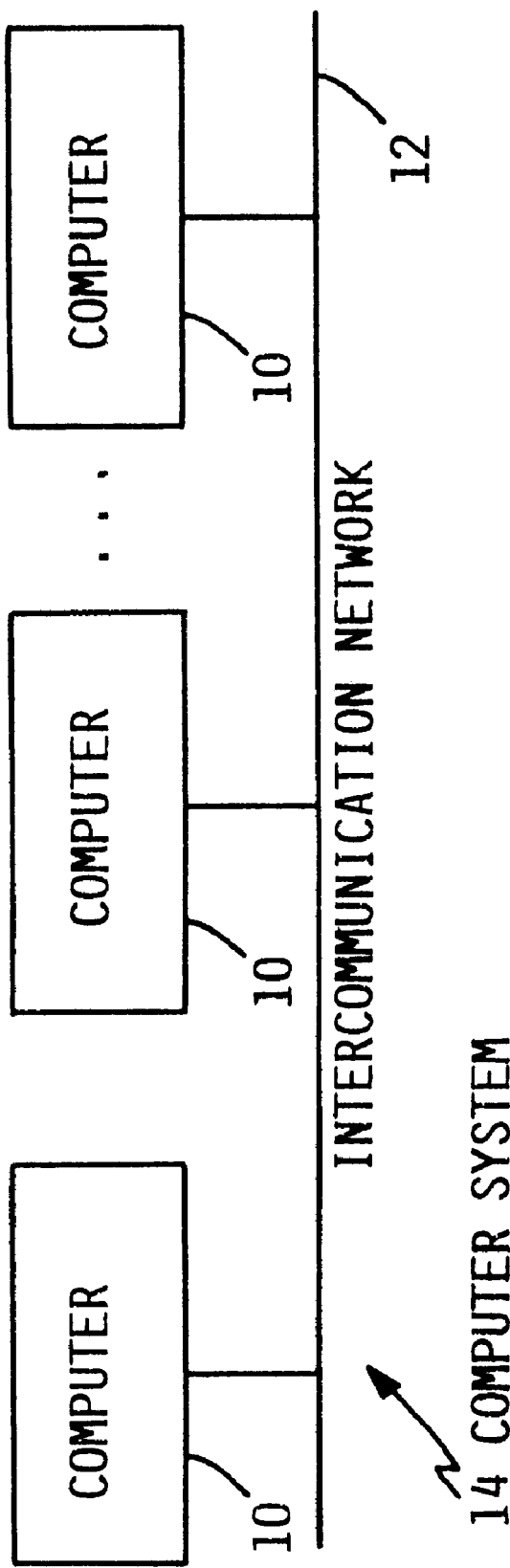
FIGS. 1A and 1B are simplified schematic block diagrams showing a prior art network of multiprocessor computers and a representative prior art shared-memory multiprocessor computer.
Figure 1B:
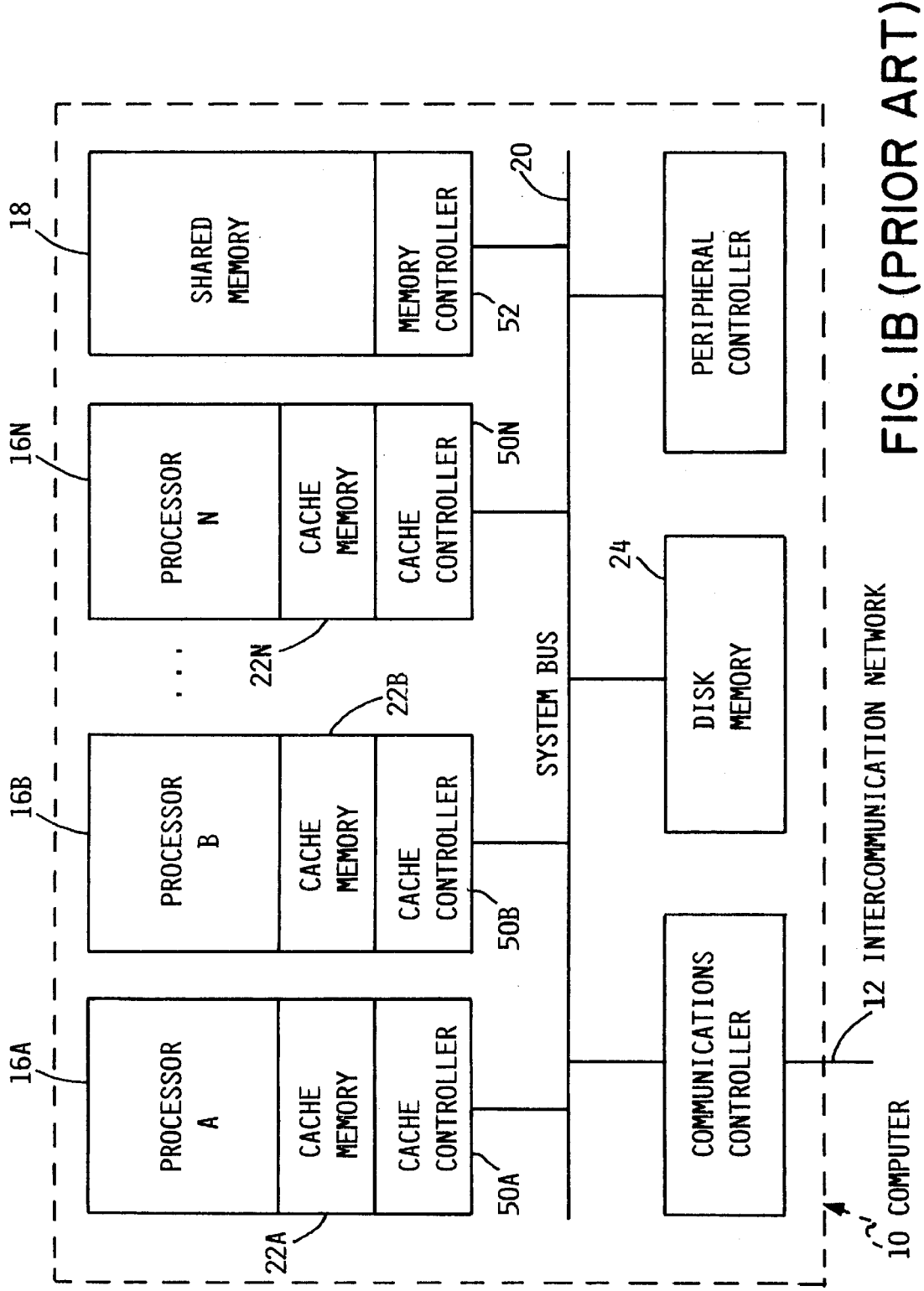

Still another use for mutual-exclusion mechanism 90 is for maintaining the coherency of shared data in a loosely coupled multicomputer system such as computer system 14 of FIG. 1A. Mutual-exclusion mechanism 90 is installed in each computer 10. Each of computers 10 is informed of updates to a common data structure, a copy of which is maintained on each of computers 10, by messages passed between computers 10 over interconnection network 12.

For example, when a particular computer 10 updates its copy of the data structure, an update message is sent to the other computers 10 where each associated mutual-exclusion mechanism 90 updates the local copy of the data structure.

Each of computers 10 may have a different configuration, thereby dictating a different implementation of mutual-exclusion mechanism 90 on each computer 10.

It will be obvious to those having skill in the art that many changes may be made to the details of the above-described embodiments of this invention without departing from the underlying principles thereof. Accordingly, it will be appreciated that this invention is also applicable for maintaining data coherency in other than multiprocessor computer applications. The scope of the present invention should be determined, therefore, only by the following claims.

What is claimed is:

1. A method of using an updater thread to initiate a change in mode of operation of a computer system, the method comprising the following steps:

providing an updater thread that updates a shared data element;

with the updater thread:

setting a shared data element that other threads check to indicate to such threads a new mode of operation; p1 using a summary of thread activity to determine when other threads that are responsive to the new mode of operation have passed through a quiescent state since the shared data element was set; and continuing operation of the updater thread in the new mode after it is determined that the other threads have passed through a quiescent state, such other threads proceeding in operation without interruption from the updater thread; and simultaneously performing the following steps with each of the other threads:

checking the shared data element without using mutual exclusion; and continuing a thread's execution in the mode of operation indicated by the shared data element.

2. The method of claim 1 including registering a callback that notifies the updater thread when the other threads have passed through a quiescent state.

3. A computer-readable medium for storing a computer program comprising instructions for executing the method of claim 1.

4. A computer system in accordance with the method of claim 1.

5. Apparatus for using an updater thread to initiate a change in mode of operation of a computer system, comprising:

means for providing an updater thread that updates a shared data element;

means for using the updater thread for:

setting a shared data element that other threads check to indicate to such threads a new mode of operation;

using a summary of thread activity to determine when other threads that are responsive to the new mode of operation have passed through a quiescent state since the shared data element was set; and continuing operation of the updater thread in the new mode after it is determined that the other threads have passed through a quiescent state, such other threads proceeding in operation without interruption from the updater thread; and means for simultaneously performing the following steps with each of the other threads:

checking the shared data element without using mutual exclusion; and continuing a thread's execution in the mode of operation indicated by the shared data element.

6. The apparatus of claim 5 including registering a callback that notifies the updater thread when the other threads have passed through a quiescent state.

* * * * *